United States Patent
Patil et al.

(10) Patent No.: US 12,190,093 B2
(45) Date of Patent: Jan. 7, 2025

(54) SYSTEMS AND METHODS OF OFFLINE OVER THE AIR (OTA) PROGRAMMING OF APPLIANCES

(71) Applicant: WHIRLPOOL CORPORATION, Benton Harbor, MI (US)

(72) Inventors: Vivek Patil, Pune (IN); Manish Saha, Pune (IN); Dhanimol Sebastian, Kannur (IN); Marcelo Sepulveda, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 143 days.

(21) Appl. No.: 17/679,747

(22) Filed: Feb. 24, 2022

(65) Prior Publication Data
US 2023/0266960 A1    Aug. 24, 2023

(51) Int. Cl.
*G06F 8/65*    (2018.01)
*H04L 69/16*   (2022.01)
*H04W 76/10*   (2018.01)

(52) U.S. Cl.
CPC .............. *G06F 8/65* (2013.01); *H04L 69/16* (2013.01); *H04W 76/10* (2018.02)

(58) Field of Classification Search
CPC .......... G06F 8/65; H04L 69/16; H04W 76/10
See application file for complete search history.

(56) References Cited

U.S. PATENT DOCUMENTS

| | | | |
|---|---|---|---|
| 6,256,378 B1 | 7/2001 | Iggulden et al. | |
| 6,954,850 B1 | 10/2005 | Howard et al. | |
| 7,171,661 B1 * | 1/2007 | Pinera | G06F 8/65 717/172 |
| 8,484,633 B2 * | 7/2013 | Kim | G06F 8/65 455/418 |
| 8,880,049 B2 * | 11/2014 | Furuta | H04L 67/34 455/418 |

(Continued)

FOREIGN PATENT DOCUMENTS

| | | |
|---|---|---|
| DE | 10062671 A1 | 12/2000 |
| DE | 102012206536 A1 | 10/2013 |

(Continued)

*Primary Examiner* — Douglas M Slachta
(74) *Attorney, Agent, or Firm* — Price Heneveld LLP

(57) ABSTRACT

A system is provided for programming one or more of a plurality of appliances of the same type. The appliances are commercial laundry appliances. The system includes a communication device and the plurality of appliances communicatively coupled with the communication device through a wireless connection. The communication device can be configured to acquire appliance information from the appliances. Based on the acquired information, the communication device determines whether one or more of the appliances requires a program update. The communication device of the system receives and stores into a memory the program update, then transmits the program update to the appliances. The communication device uses a broadcast transmission protocol, user datagram protocol (UDP), for programming the respective appliances requiring a program update. A method for programming simultaneously a plurality of commercial laundry appliances includes using the same system.

15 Claims, 3 Drawing Sheets

(56) References Cited

U.S. PATENT DOCUMENTS

| | | | |
|---|---|---|---|
| 9,026,648 B1* | 5/2015 | Slavin | H04L 67/10 709/224 |
| 9,307,067 B2* | 4/2016 | Debates | H04W 76/14 |
| 9,692,748 B2* | 6/2017 | Maheshwari | H04L 63/08 |
| 9,791,838 B2* | 10/2017 | Park | H04W 12/06 |
| 10,306,705 B2* | 5/2019 | Shanmugam | H04W 84/12 |
| 10,728,340 B2* | 7/2020 | Thummalapalli | H04L 41/0895 |
| 11,640,760 B2* | 5/2023 | Arling | G08C 19/28 340/12.54 |
| 11,895,217 B2* | 2/2024 | Kim | H04L 69/321 |
| 2005/0086322 A1* | 4/2005 | Park | G06F 8/65 709/217 |
| 2005/0120106 A1* | 6/2005 | Albertao | H04L 67/34 709/223 |
| 2006/0026304 A1* | 2/2006 | Price | G06F 8/65 710/8 |
| 2006/0195840 A1* | 8/2006 | Sundarrajan | G06F 8/61 717/176 |
| 2006/0200538 A1* | 9/2006 | Yuh | G05B 13/02 709/219 |
| 2007/0268506 A1* | 11/2007 | Zeldin | H04L 41/0894 358/1.13 |
| 2012/0079473 A1* | 3/2012 | Watanabe | G06F 8/65 717/170 |
| 2012/0173857 A1* | 7/2012 | Kobraei | G06F 8/654 713/2 |
| 2013/0081113 A1* | 3/2013 | Cherian | G06F 21/44 709/227 |
| 2014/0201728 A1* | 7/2014 | Du Toit | G06F 8/65 717/171 |
| 2015/0245182 A1 | 8/2015 | Scagnol et al. | |
| 2016/0234340 A1 | 8/2016 | Dayan et al. | |
| 2017/0220404 A1* | 8/2017 | Polar Seminario | G06F 11/0751 |
| 2017/0255362 A1* | 9/2017 | Kim | G06F 3/04817 |
| 2020/0012488 A1* | 1/2020 | Koval | G06F 8/71 |
| 2021/0112146 A1* | 4/2021 | Sevindik | H04L 69/08 |
| 2021/0326331 A1* | 10/2021 | Shin | H04L 69/16 |

FOREIGN PATENT DOCUMENTS

| | | |
|---|---|---|
| DE | 102012223243 A1 | 6/2014 |
| EP | 1215639 A2 | 11/2001 |
| EP | 3543892 A1 | 9/2019 |
| EP | 3350759 B1 | 5/2020 |
| WO | 2010139624 A1 | 12/2010 |

* cited by examiner

SYSTEMS AND METHODS OF OFFLINE OVER THE AIR (OTA) PROGRAMMING OF APPLIANCES

TECHNICAL FIELD

The present disclosure relates, in general, to appliance programming. More specifically, the present disclosure relates to over the air (OTA) software programming for appliances in commercial settings.

BACKGROUND

When manufacturing numerous types of appliances, factories have to devote time to programming each machine with operating software. Washing machines, refrigerators, dishwashers, and the like, have all increased the amount of circuitry, programming, and software included and thus may employ complicated procedures to install such features. Typically, this requires a machine-by-machine process to program each product and can often require 15-20 minutes per appliance.

Likewise, in commercial settings, such as laundry facilities (e.g., laundromats or residential laundry facilities), updates to machines at times may require physical access to machines on an individual basis. As an example, some appliances require updates to operational software through a universal serial bus (USB) drive with instructions physically stored thereon. While not usually problematic for the individual residential unit, this can once again become a time-consuming process when a bank of 20, 30 or more machines are located within the same facility. This is particularly frustrating when often times the necessary programming or update is identical across a number of machines.

U.S. Pat. No. 6,954,850B1 appears to disclose a communication adapter allowing for a variety of appliances to access software via a physical communications port. German Patent Nos. 10062671A1, 102012223243A1 also appear to describe updating an operating software of an appliance, but within the setting of an individual updates through a near-field protocol. Similarly, U.S. Patent Publication 2005/0086322A1 discloses a physical connection in order to update software to an individual residential unit.

However, these references do not disclose features allowing for the simultaneous update of numerous appliances. As such, the above-mentioned references are not suitable for efficiently updating machines in a setting such as a commercial laundry facility. The ability to share the update with a large bank of appliances or to replicate the configuration from one machine to another across a sizable facility are needed.

SUMMARY

According to one aspect of the present disclosure, a system is provided for programming one or more of a plurality of appliances of the same type. The appliances are preferably commercial laundry appliances. The system includes a communication device and the plurality of appliances communicatively coupled with the communication device through a wireless connection. The communication device can be configured to acquire appliance information from the appliances. Based on said acquired information, the communication device determines whether one or more of the appliances requires a program update. The communication device of the system receives and stores into a memory the program update, then transmits the program update to the appliances. The communication device uses a broadcast transmission protocol, preferably user datagram protocol (UDP), for programming the respective appliances requiring a program update.

In an embodiment, a commercial laundry appliance includes a communication unit to wirelessly communicate with an external communication device. The communication unit is configured to send to a controller, upon request of the same controller, information about the operating state and the software version of the appliance. The communication unit is further configured to receive a program update from the external device through a broadcast transmission protocol. The broadcast transmission protocol is preferably the UDP protocol. The commercial laundry appliance also includes a processing unit configured to install and execute the program update on the commercial laundry appliance.

In yet another embodiment, a method for programming simultaneously a plurality of appliances of the same type is provided. The plurality of appliances is preferably one of commercial laundry appliances. The method includes a communication device connecting to a plurality of appliances through a wireless connection. The communication device acquires appliance information from the appliances. Based on said acquired information, the communication device determines whether one or more of the appliances require a program update. A program update is received and stored in a memory for the appliances. Upon a positive determination, the program update is transmitted to the appliances using a broadcast transmission protocol, preferably the user datagram protocol (UDP). The appliances requiring a program update are then programmed.

These and other aspects and feature of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
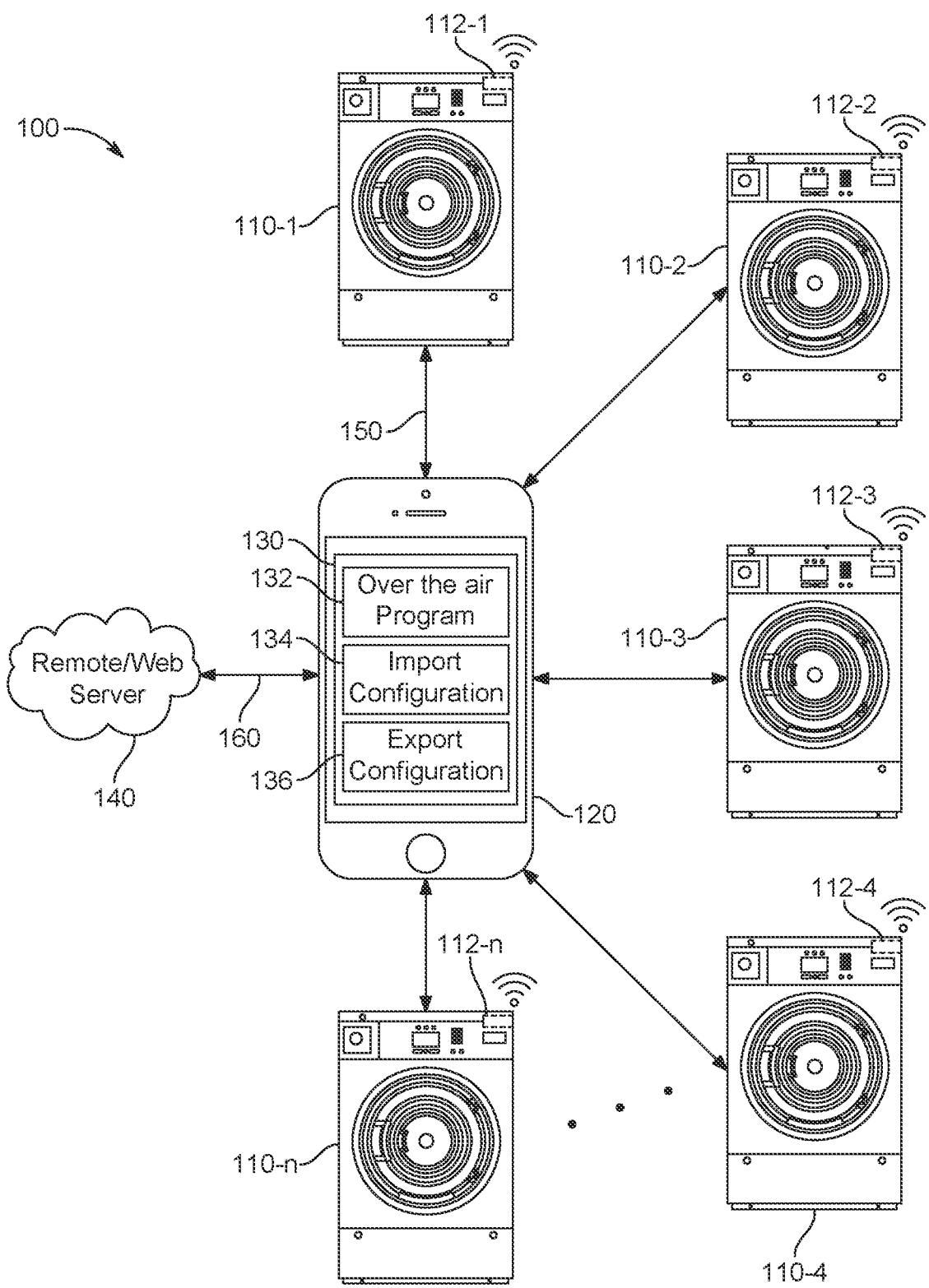
FIG. 1 is a system for offline over the air (OTA) programming of appliances, according to an embodiment of the present disclosure.

Referring to FIG. 1, a system 100 for programming one or more of a plurality of appliances is shown, according to some embodiments. The plurality of appliances to be programmed within the system 100 can be of the same type. In some embodiments, the appliances within the plurality are preferably commercial laundry appliances. System 100 can provide over-the-air (OTA) programming to appliances via a mobile device or smartphone.

As shown in FIG. 1, the system 100 includes a plurality of appliances, denoted as 110-1, 110-2, . . . 110-n (denoted collectively hereinafter as "appliances 110" or in the alternative "washers 110"). Each of the appliances 110 within the plurality includes a respective appliance control unit, numbered as 112-1 through 112-n (also referred to as "control units 112" when described collectively).

The system 100 of FIG. 1 further includes a communication device 120, which in some embodiments can be a smartphone with cellular capabilities. In alternative embodiments, the communication device 120 can be a tablet, a laptop, personal data assistant, radio frequency identification (RFID) reader, or other similar mobile technology. The communication device 120 includes a graphical user interface (GUI) 130, in some embodiments. As further shown in FIG. 1, the GUI 130 contains at least three operation selections, including an update operation button 132, a configuration import button 134, and a configuration export button 136.

The system 100 shown in FIG. 1 includes a server 140, according to some embodiments. The server 140 can be any one of several types of servers capable of transmitting and receiving data and files to/from the communication device 120 via cellular service, an internet connection, or other wired or wireless connection. For instance, the server 140 can be a remote server, a web server, or a cloud-based server executing instructions in any of a number of transmission protocols (such as hypertext transfer protocol (http) as just one example).

FIG. 1 further depicts a first communication interface 150 enabling a connection between the appliances 110 and the communication device 120, according to some embodiments. While the first communication interface 150 is only shown as connecting the appliance 110-1 and the communication device 120, the first communication interface 150 is understood to enable transmissions between the communication device 120 and any of the appliances 110. As an example, the first communication interface 150 can be a Wireless Local Area Network (WLAN) operating without internet connectivity in some embodiments. One of skill in the relevant art will understand other protocols, specifications, or standards that can be used by the first communication interface 150 to send and receive data and files to or from the appliances 110 (such as Bluetooth or Zigbee).

FIG. 1 also depicts a second communication interface 160 enabling a connection between the communication device 120 and the server 140. In some embodiments, the communication device 120 can use the second communication interface 160 to communicate with the server 140 to access firmware or software updates for one or more of the appliances 110 among the plurality of appliances. The second communication interface 160 can include one or more of several cellular or data communication protocols with access a cloud-based server or an internet-accessible resource. The second communication interface 160 can include, without limitation, such protocols as 3G, 4G, LTE, 5G, or Wi-Fi, among others.

A more detailed example will now be described to outline the operation of the system 100 in a particular setting. For instance, the system 100 can be implemented in a commercial laundry setting (i.e., a laundromat or residential laundry facility involving a number of units). The appliances 110 can be a plurality of commercial laundry units 110-1 to 110-n. Continuing with the example, the communication device 120 can be a smartphone connected to a commercial laundry unit 110 via a Wi-Fi connection (serving as the first communication interface 150). The smartphone can be connected to a cellular network (serving as the second communication interface 160) in order to access the server 140, which can be a web server of a manufacturer of the appliances 110.

A technician, a laundromat proprietor, a residential community manager or other user responsible for the operation of the commercial laundry facility can use the smartphone/communication device 120 to access the manufacturer's server 140. The user can check the appliances/washers 110 to see if updates are available for the particular machine. When a determination is made that an update is available and appropriate, the smartphone/communication device 120 can be used to receive the update over the second communication interface 160 that can be the cellular network or wireless network, then transmit the update to the appliance over the Wi-Fi connection in some embodiments. For example, the user may use the update operation button 132 to initiate and implement the update in the appliances/washers 110. In another example implementation, the manufacturer's server 140 may automatically send a push notification to the smartphone/communication device 120 about an availability of updates. The technician, a laundromat proprietor, a residential community manager or other user responsible for the operation of the commercial laundry facility can use the smartphone/communication device 120 to receive the update over the cellular network, then transmit the update to the appliance over the Wi-Fi connection. In another example implementation, the manufacturer's server 140 may automatically communicate the update over the second communication interface 160. The smartphone/communication device 120 transmits the update to the appliance over the Wi-Fi connection. As another example, the user can transfer an identical configuration from one washer at the facility to another washer, so that updates to configurations can be replicated without physically accessing each machine. For example, the user can use the smartphone/communication device 120 to connect with the appliances/washers 110. Further, the user can use the configuration import button 134 to obtain the configuration of the appliances/washers 110 that the smartphone/communication device 120 is connected with. The user can then connect with another appliances/washers 110 and use the configuration export button 136 to push the stored configuration to appliances/washers 110 that the smartphone/communication device 120 is connected with. In some implementations, the smartphone/communication device 120 can be coupled with more than one appliances/washers 110, and the update may be performed using a broadcast transmission protocol, preferably using a user datagram protocol (UDP).

Figure 2:
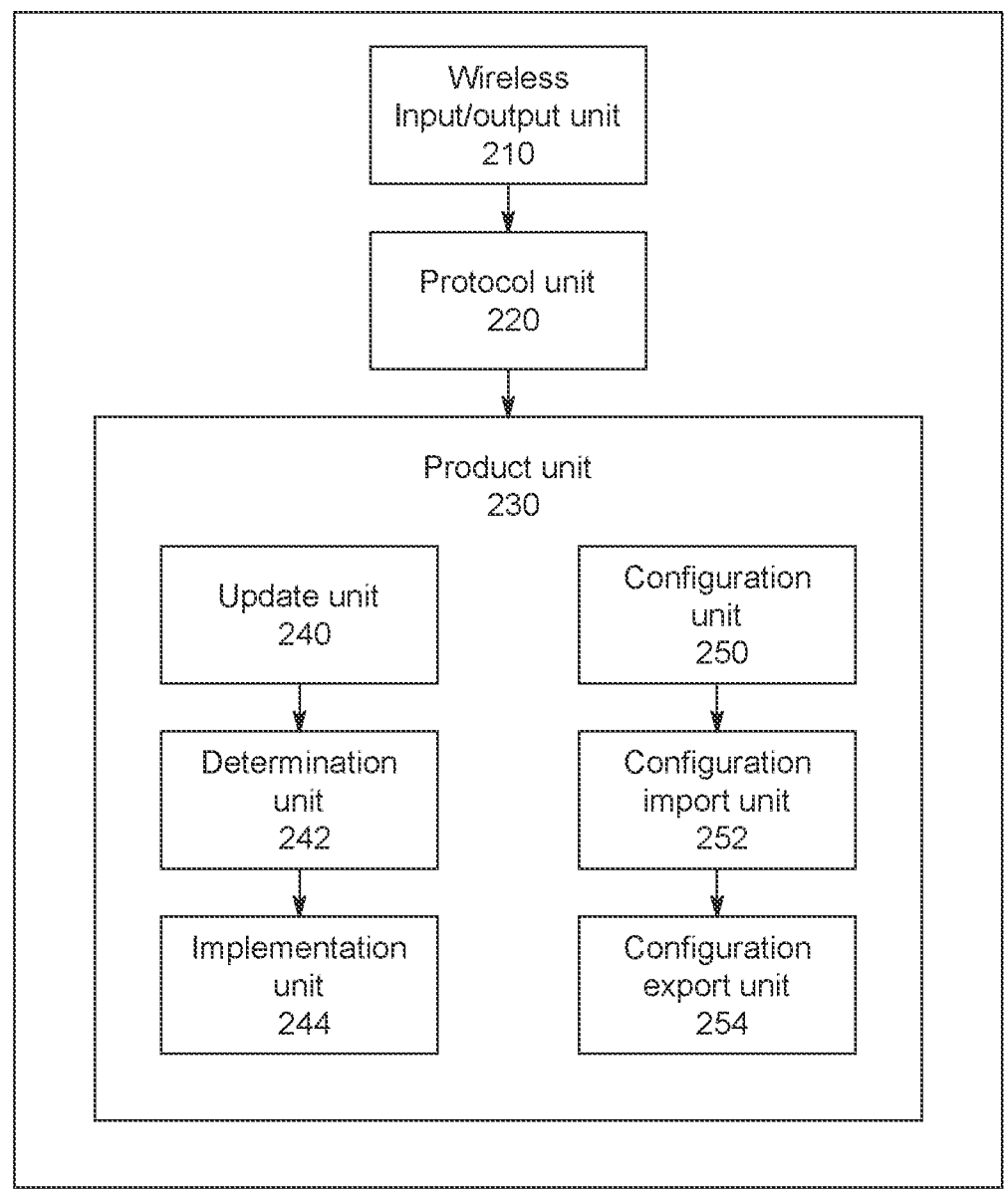
FIG. 2 is a mobile application for the OTA programming of appliances, according to an embodiment of the present disclosure.

Referring to FIG. 2, a mobile application 200 can be installed and execute operations on the communications device 120, according to embodiments of the present disclosure. The mobile application 200 can also control data communications and files transmitted and received to/from the control unit 112 of the appliance 110 as well as to/from the server 140. The mobile application 200 is shown as a functional block diagram having a wireless input/output unit 210, a protocol unit 220, and a product unit 230.

The wireless input/output unit 210 enables communication with the plurality of appliances 110 and the web server 140, according to some embodiments. The wireless input/output unit 210 can be in communication with other applications executed by the communication device, such as system tools or those enabling additional input/output methods (e.g., additional peripheral devices, adaptive tools, etc.). The protocol unit 220 identifies and enables use of various protocols based on the devices with which the communications device 120 is connecting. For example, the protocol unit 220 can convert updates from or into a user datagram protocol (UDP) transmission form or to other formats as appropriate.

The product unit 230 can be a unit enabling the mobile application 200 to service multiple appliances, such as various types of appliances or specific models of a specific type of appliance. The product unit 230 further includes an over-the-air (OTA) update unit 240 and a configuration unit 250. Returning to the example outlined above, the product unit 230 can include a database storing information specific to various types of laundry appliances, such as washers and dryers for a commercial setting. The product unit 230 can further include instruction sets for those respective appliances and versioning information of operational software for the appliances.

The OTA update unit 240 enables the mobile application 200 to update appliances when update is appropriate. The OTA update unit 240 can include an update determination unit 242 and an update implementation unit 244, in some embodiments. For example, OTA update determination unit 242 can analyze criteria for whether or not an update is appropriate for a particular model of laundry appliance based on a version number, a timestamp or a change log associated with the appliance, or the like. The update implementation unit 244 can include instructions capable of receiving or transmitting the updates so that the appliances can install the updates, along with one or more memories for storing the updates.

The configuration unit 250 can include a configuration import unit 252 and a configuration export unit 254, according to some embodiments. In order to transfer the configuration from one appliance to another, a user can simply use the tools of the configuration unit 250 rather than connecting with a server (such as the server 140). As an example, the configuration import unit 252 can retrieve parameters and instructions from an appliance, while the configuration export unit 254 can push a set of parameters and instructions to an appliance.

Figure 3:
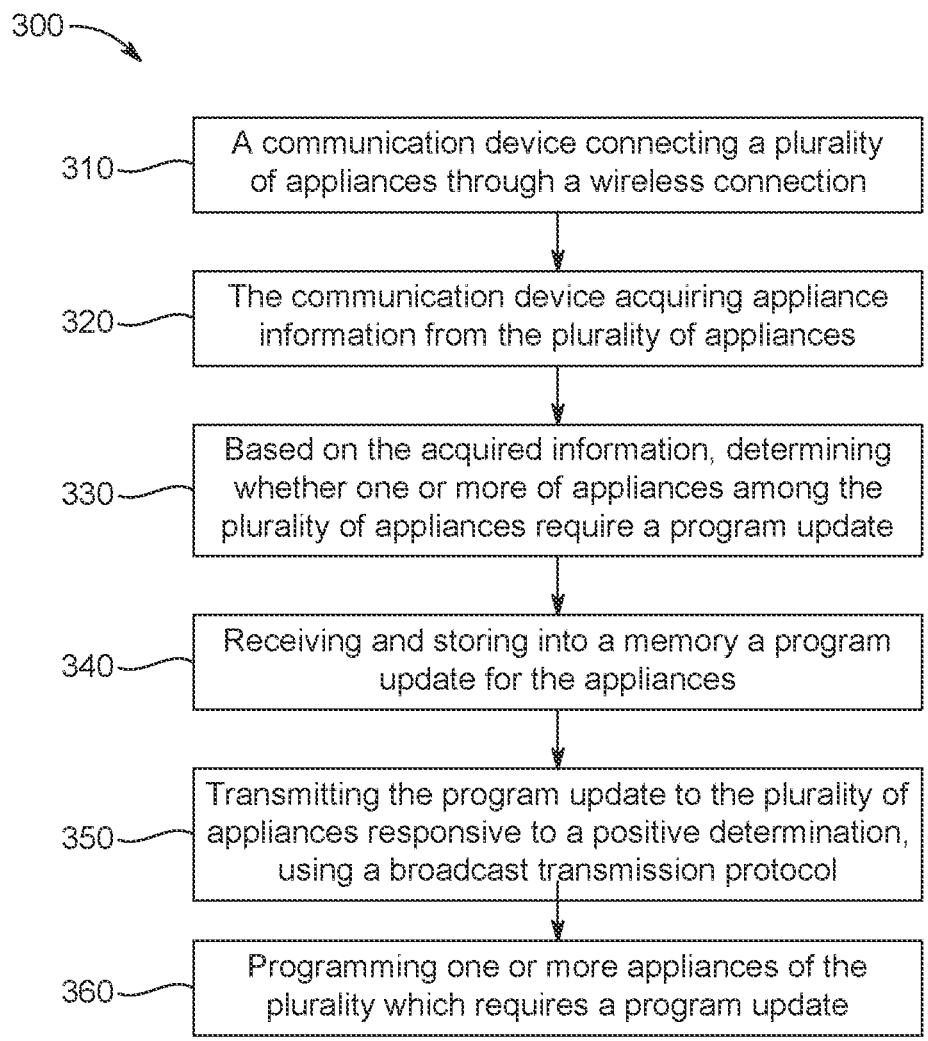
FIG. 3 is a flow diagram representing a method for programming a plurality of appliances, according to an embodiment of the present disclosure.

FIG. 3 is a flow diagram representing a method 300 for programming a plurality of appliances, according to some embodiments of the present disclosure. The appliances among the plurality can be programmed simultaneously and can be of the same type. In certain embodiments, the plurality includes commercial laundry appliances, such as washers and dryers, in facilities as described above and below.

At step 310, a communication device (e.g., the smartphone 120 as shown in FIG. 1) connects to the plurality of appliances (e.g., the appliances 110 from FIG. 1) through a wireless connection. In an example, the wireless connection in the step 310 uses a WLAN or Wi-Fi connection without internet access to connect. At step 320, the communication device acquires appliance information from the plurality of appliances. For example, device 120 in FIG. 1 using a mobile application (as shown above in FIG. 2) can retrieve appliance information, such as model information or current instruction versions, from the appliances 110.

At step 330, a determination can be made as to whether one or more of appliances among the plurality of appliances should be updated with a program update. The determination is made based on the information previously acquired in the step 320. For example, the determination can be made based on appliance information such as the current version of instructions included in a control unit (e.g., control unit 112). In some embodiments, this determination can be made by a specified module, such as the update determination unit 242 described above with respect to FIG. 2.

At step 340, a program update for the appliances is received and stored in a memory. As an example, the communication device 120 can receive the program update for storage in a device memory, an extended device memory such as a subscriber identity module (SIM) card, a secure digital (SD) card, or the like. In some embodiments, the memory can be associated with other elements of the communication device, such as the update implementation unit 244 described above.

At step 350, the program update is transmitted to the plurality of appliances responsive to a positive determination. The program update can be transmitted using a specific broadcast transmission protocol. In some embodiments, the broadcast transmission protocol is the UDP protocol. At step 360, the appliances requiring a program update are programmed with the update.

As seen from the above descriptions and the below claims, the present disclosure provides for the simultaneous update of numerous appliances. The described and illustrated embodiments are suitable for efficiently updating machines in a setting such as a commercial laundry facility. The ability to share updates with a large bank of appliances and/or to replicate the configuration from one machine to another across a sizable facility greatly reduces the time needed to implement updates.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A system for programming one or more of a plurality of appliances, the system comprising:
   a communication device comprising a protocol unit; and
   the plurality of appliances communicatively coupled with the communication device through a wireless connection,
   wherein the communication device is configured to:
   acquire appliance information from said plurality of appliances;
   determine, based on said acquired information, whether one or more of said plurality of appliances require a program update;
   receive and store into a memory the program update;
   identify and enable use of various protocols of devices with which the communication device is in communication;
   convert the program update into a user datagram protocol (UDP); and wherein, upon a positive determination, transmit the program update to the plurality of said appliances using the user datagram protocol (UDP), and programming the one or more of said plurality of appliances requiring a program update.

2. A method for programming simultaneously a plurality of appliances, the method comprising:
connecting, by a communication device a plurality of appliances through a wireless connection, wherein the plurality of appliances comprises a first appliance and a second appliance;
acquiring and storing into a memory, by the communication device, an appliance configuration from the first appliance;
determining, based on said appliance configuration, to push the appliance configuration to the second appliance;
identifying and enabling use of various protocols of devices in communication with the communication device and converting the appliance configuration to a user datagram protocol;
pushing the appliance configuration to the second appliance using the user datagram protocol; and
programming the second appliance with the appliance configuration.

3. The system of claim 1, wherein the communication device is further configured to:
receive an appliance configuration from the plurality of appliances.

4. The system of claim 1, wherein the communication device is further configured to:
push an appliance configuration to the plurality of appliances.

5. The system of claim 1, wherein the program update comprises an appliance configuration.

6. The system of claim 1, wherein the communication device is further configured to:
acquire information from a first appliance and a second appliance;
receive and store into memory an appliance configuration obtained from the first appliance; and
transmit the appliance configuration to the second appliance.

7. The system of claim 1, wherein the communication device is further configured to:
import an appliance configuration and export the appliance configuration to an appliance in response to a user input.

8. The system of claim 1, wherein the communication device is a smartphone.

9. The system of claim 1, wherein the communication device comprises a wireless input and output unit that communicates between the communication device and the plurality of appliances.

10. The system of claim 1, wherein the protocol unit is further configured to:
convert program updates from user datagram protocol into another transmission form.

11. The system of claim 1, wherein the communication device comprises a product unit that stores information specific to various types of laundry appliances, appliance instruction sets, and versional information of operational software for the appliances.

12. The system of claim 1, wherein the communication device comprises an update determination unit that is configured to determine an update status based on a version number, a timestamp, or a change log associated with the plurality of appliances.

13. The system of claim 1, wherein the communication device comprises a configuration unit that is configured to import an appliance configuration and export the appliance configuration to the plurality of appliances.

14. The system of claim 1, wherein the communication device comprises a mobile application comprising a wireless input and output unit, a protocol unit, and a product unit.

15. The system of claim 1, wherein the communication device is further configured to:
receive a push notification when the program update is available.

* * * * *